(No Model.) 2 Sheets—Sheet 2.

A. DAGGETT.
ROAD RAKE.

No. 553,749. Patented Jan. 28, 1896.

WITNESSES:
Edward Thorpe.
H. P. Hutchinson

INVENTOR
A. Daggett
BY
Munn & Co
ATTORNEYS.

UNITED STATES PATENT OFFICE.

ALBERT DAGGETT, OF STRONG, MAINE.

ROAD-RAKE.

SPECIFICATION forming part of Letters Patent No. 553,749, dated January 28, 1896.

Application filed January 30, 1895. Serial No. 536,681. (No model.)

*To all whom it may concern:*

Be it known that I, ALBERT DAGGETT, of Strong, in the county of Franklin and State of Maine, have invented a new and Improved Road-Rake, of which the following is a full, clear, and exact description.

My invention relates to improvements in that class of machinery which is used in smoothing and leveling roads; and the object of my invention is to produce a simple machine in the form of a rake which is adapted for use on country or unpaved roads, which is adapted to sweep from the road all loose stones and other obstructions without disturbing the roadbed or gravel, which is adapted also to level the road by breaking up dried chunks of mud and other earthy matter, and which is adapted to follow road-machines in making and repairing roads, so as to leave the road in the best possible condition.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1:
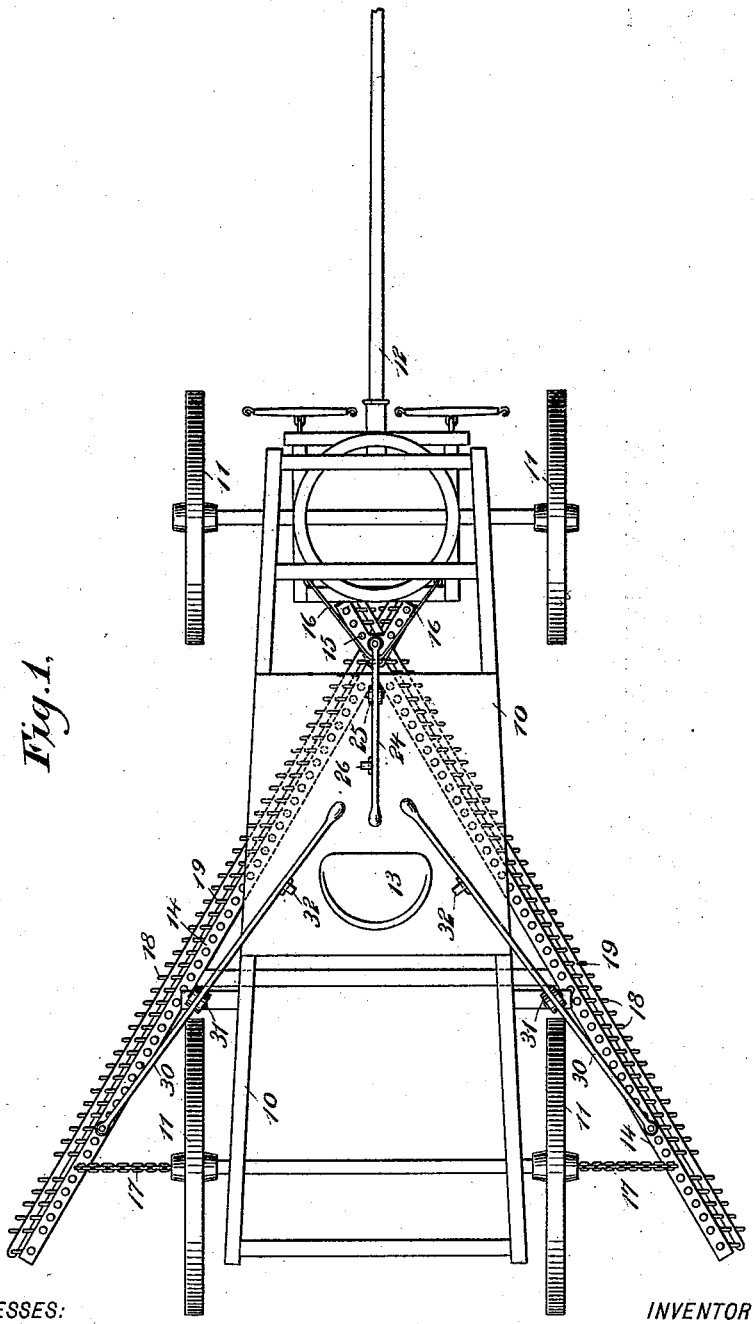
Figure 2:
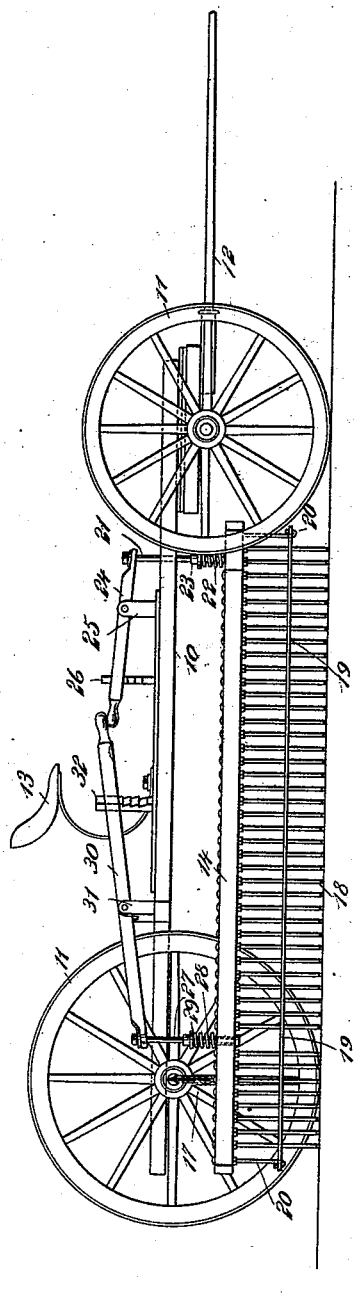
Figure 3:
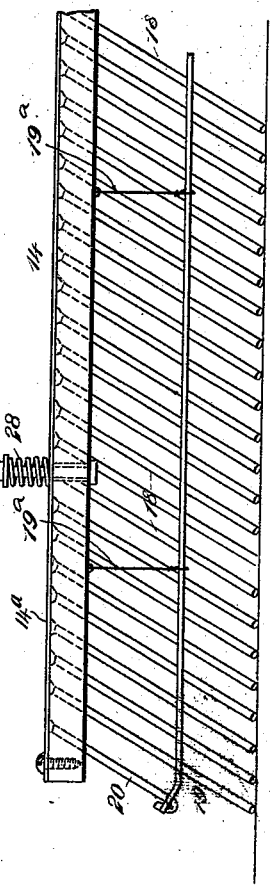

Figure 1 is a plan view of my improved machine. Fig. 2 is a side elevation of the same, and Fig. 3 is a detail side elevation of one of the rakes.

The device embodying my invention is used in connection with a vehicle, which may be either a one-horse or a two-horse vehicle, and the special construction of which forms no part of my invention. As illustrated, the rake is used in connection with a bed 10, which is mounted in the usual way on four wheels 11, and the vehicle is provided with the ordinary draft-pole 12, although if it is to be drawn by a single horse thills will be substituted for the pole. The bed is provided with a suitable seat 13, on which the driver may sit and from which he may work the several levers necessary to regulate the rake.

The rake-back comprises a pair of diverging rails 14, which are arranged beneath the bed 10 and are near their front ends crossed, as shown at 15, and halved together, being fastened by one of the rake-teeth which extends through them at this point, and the teeth extend to the extreme front ends of the rails. The rake is provided with brace-rods 16, which extend forward to the front portion of the frame, being connected at their rear ends to the rake near the front end thereof, as shown clearly in Fig. 1.

The rear ends of the rails or rake-back 14 are provided with chains 17, which are secured to the nuts of the rear axle. The rake-back is provided with a series of depending teeth 18, which are preferably of steel, and which have a rearward direction, as shown clearly in Fig. 3. These teeth extend downward through guides 19, which should be of leather or other flexible material, so that they will stiffen the teeth and yet permit them to have the necessary freedom of movement. The guides 19 are secured to hooks 20 which extend downward from the rear ends of the rake-backs or rails 14, and the guides 19 are further supported by wires 19$^a$, which are dropped from the rails 14.

The rake-teeth 18 may be fastened to the rails 14 by means of nuts, as shown in Fig. 2, or they may be fastened, as illustrated in Fig. 3, where the teeth are held in holes extending diagonally through the rails 14, the heads on the upper ends of the teeth preventing them from dropping through, and they are prevented from rising by a binding-plate 14$^a$, which is secured to the tops of the rails.

The pivot-block 15 at the point of the rake is suspended on a rod 21, and is normally pressed downward on the rod by a spring 22, which is arranged between the block and a collar 23 on the rod, and this spring permits the point of the rake to rise sufficiently to permit the rake to pass over any serious obstruction, this action being further facilitated by the spring of the teeth. The upper end of the rod is pivoted to a lever 24, which is fulcrumed on a post 25 and moves opposite a notched bar 26, and by depressing the rear end of the lever the point of the rake may be raised and by adjusting the lever in one of the notches of the bar 26 it and the front end of the rake may be held in a desired position.

The rear ends of the rake-backs or rails 14 are supported on rods 27 extending through perforations in the rails 14 and having heads at their lower ends, and said rails 14 are pressed downward by springs 28, which encircle the rods between the rake-backs and collars 29 on the rods. The upper end of each rod 27 is pivoted to a forwardly-extending lever 30, which is fulcrumed on a post 31 and extends to a point where it may be conveniently reached from the seat 13, the lever tilting opposite a notched bar 32, in one of the notches of which it may be placed so as to hold it in a desired position, and it will be seen that by depressing the front end of the lever the rear end is raised and also the rake-back to which it is connected by reason of the engagement of the head at the lower end of the rod 27 with the under side of the rail 14. It will thus be seen that either side of the rake may be raised as desired to adapt it to the varying conditions of the road.

When the carriage and rake are drawn forward it will be seen that the loose stones of any considerable size, together with any other obstructions in the road, will be caught by the rake-teeth and carried backward and to one side, until finally the said obstructions are discharged at the side of the road. The V-shaped rake is preferably employed; but it will be seen that by prolonging one of said rails it may be made to sweep the road clean without using the other rail and its teeth.

Having thus described my invention, I claim as new and desire to secure by Letters Patent—

1. A road-rake, comprising a wheeled vehicle, a rake suspended below the same and having a back provided with perforations extending through it, rods extending through the perforations in the rake-back and provided with heads at their lower ends adapted to engage the under surface of the back, springs on the rods adapted to press against the upper surface of the rake-back, and levers connected to the rods, substantially as set forth.

2. A road-rake comprising a wheeled vehicle, a rake suspended therefrom and composed of rails having perforations extending at an angle to the vertical, spring-teeth secured in said perforations, and means for raising and lowering the rake, substantially as set forth.

3. A road-rake, comprising a vehicle, a V-shaped rake suspended point forward from the vehicle, and a lever mechanism connected to the sides of the rake, and adapted to raise one side of the rake independently of the other side, substantially as described.

4. The combination, with the rake, of the flexible guide embracing the rake-teeth, substantially as described.

5. The combination, with the vehicle, of the V-shaped rake suspended beneath it, a lever for raising and lowering the point of the rake, and independent levers for raising the sides of the rake, substantially as described.

6. The combination, with the four-wheeled vehicle, of the V-shaped rake suspended point forward beneath the vehicle and with its sides extending in front of the rear wheels of the vehicle, a suitable brace for the point of the rake, flexible connections between the sides of the rake and the rear axle of the vehicle, a lever for raising the point of the rake, and independent levers for raising the sides of the rake, substantially as described.

ALBERT DAGGETT.

Witnesses:
W. L. DAGGETT,
ADA E. P. DAGGETT.